Jan. 22, 1963     E. WILBUSHEWICH     3,074,246
METHOD AND APPARATUS FOR COOLING GOODS PACKED IN CONTAINERS
Filed Oct. 15, 1958     3 Sheets-Sheet 1
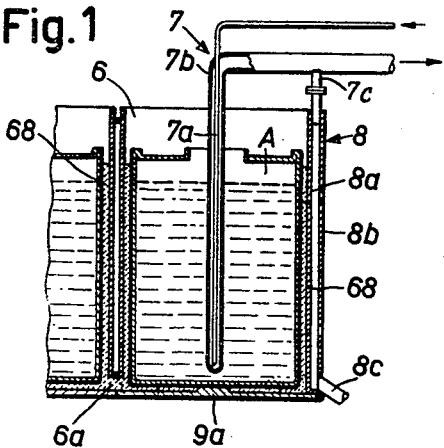
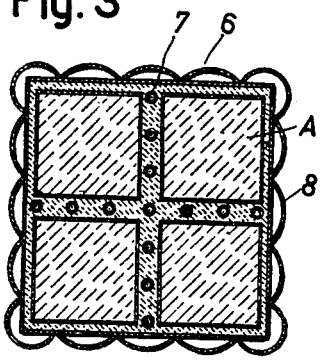
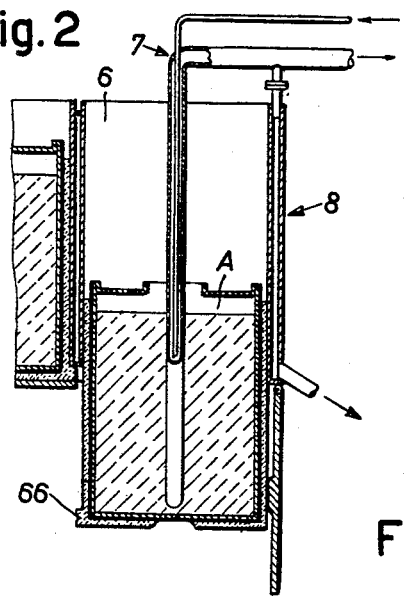
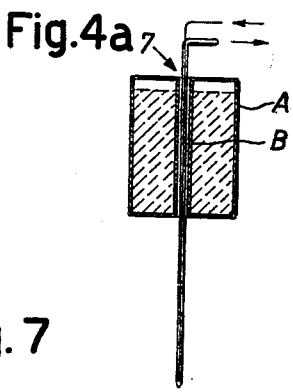
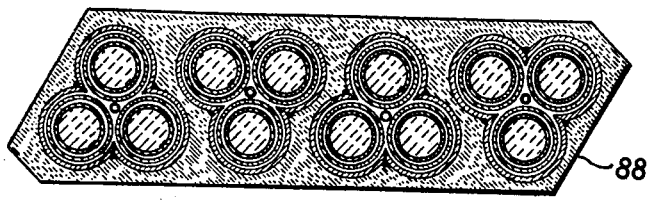
INVENTOR
EUGEN WILBUSHEWICH
By Kurt Kelman
HIS AGENT

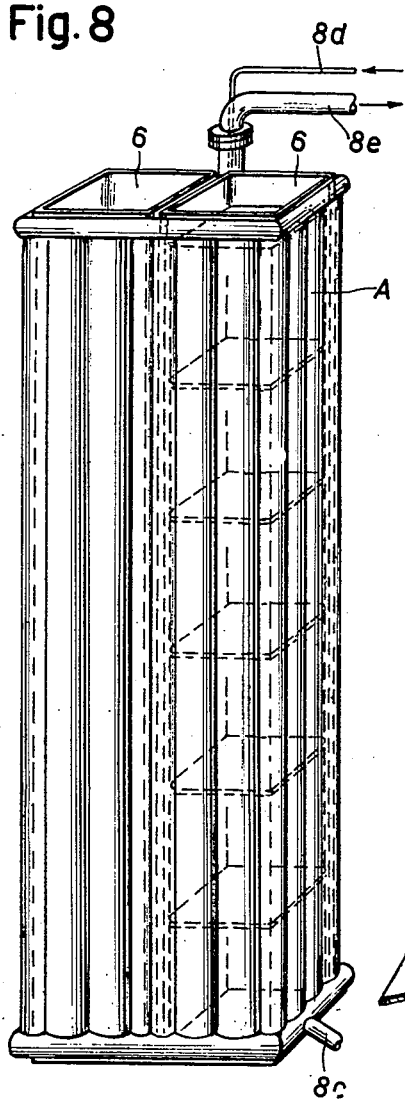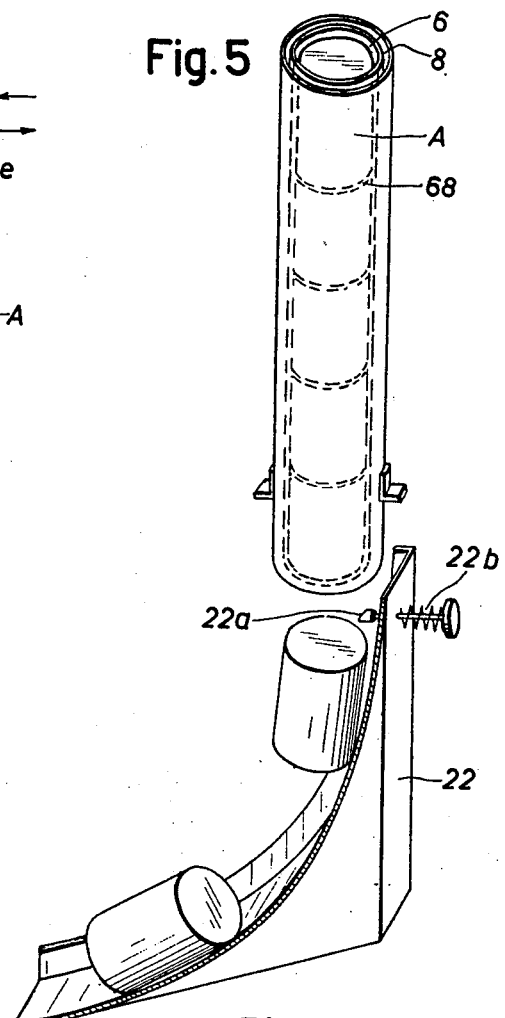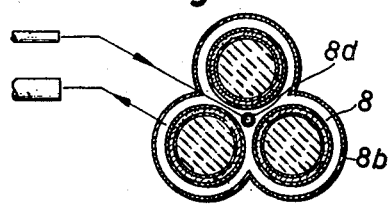

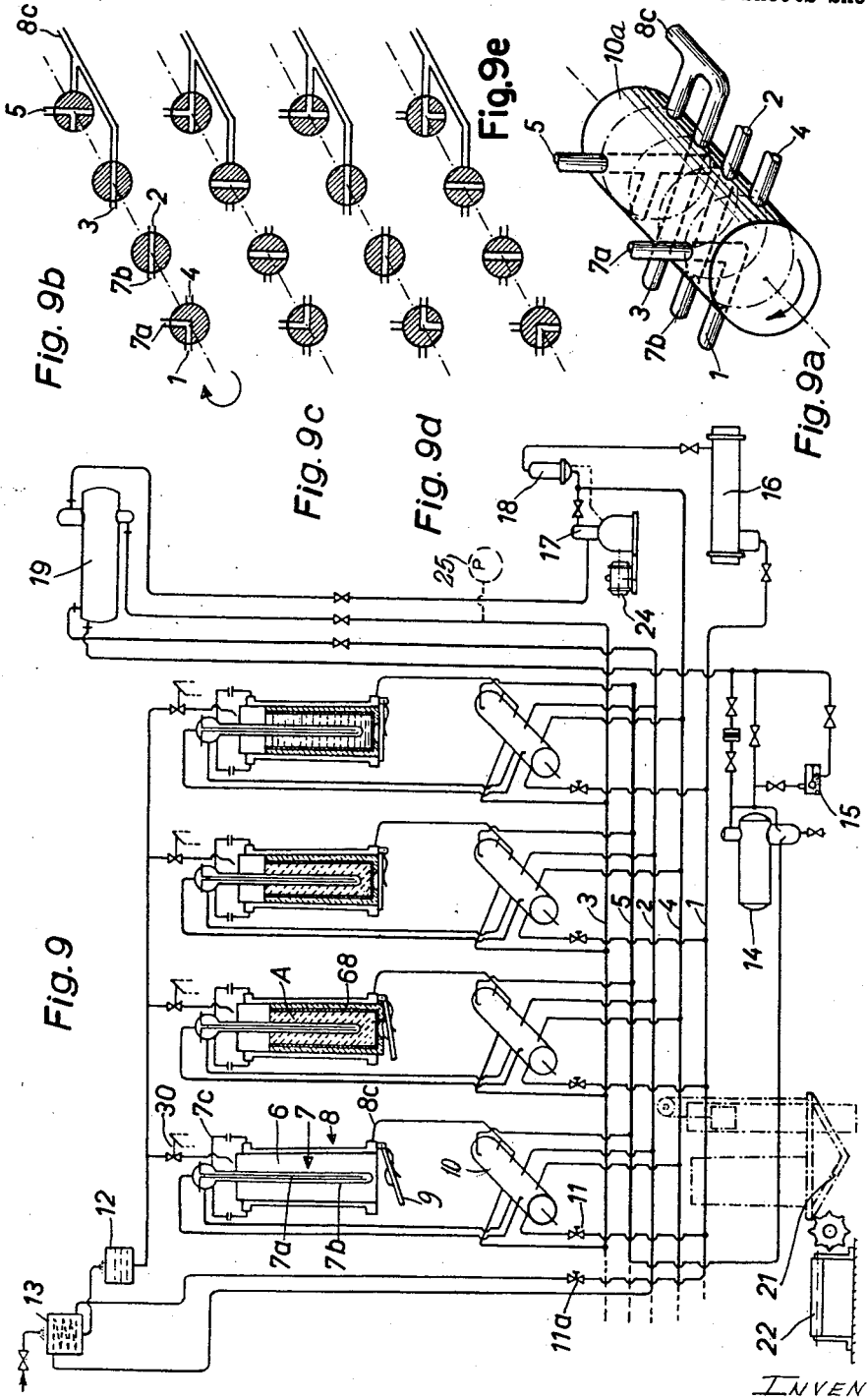

United States Patent Office 3,074,246
Patented Jan. 22, 1963

3,074,246
METHOD AND APPARATUS FOR COOLING
GOODS PACKED IN CONTAINERS
Eugen Wilbushewich, Rotelstrasse 61,
Zurich, Switzerland
Filed Oct. 15, 1958, Ser. No. 767,394
12 Claims. (Cl. 62—62)

The invention relates to an improved system for cooling goods, such as foodstuffs, packed in containers, to a temperature at which they may be stored without significant deterioration. Examples of such goods include egg yolk, fruit juices, purees of berries, citrus fruits, tomatoes and apples, vegetables, meat or milk products.

It is known for this purpose to cool down the goods stacked on conveyors in a wind tunnel with a stream of air at very low temperature, for example —40° C. This method requires involved and expensive equipment and, owing to the poor heat conducting quality of air, it also takes a relatively long time; for example, approximately 60 hours are required for cooling egg yolks, packed in 25 x 25 x 35 cm. containers, down to —18° C.

It is also known to place cans containing foodstuffs into a high-concentrated deep-cooled brine solution. However, there always adhere to the cans residual brine droplets which in time corrode the wall and give rise to contamination of the wares. This method, too, requires much space and complicated operation.

The methods formerly used for this purpose, moreover, have been protracted owing to the comparatively low rate of heat transfer between the containers and the source of refrigeration employed. The object of the present invention, therefore, is to improve the rate of heat transfer in order to expedite the rate at which the goods are cooled to the required temperature.

Accordingly, the invention provides a method of cooling goods packed in a container, consisting of arranging the container in closely spaced relationship to a cooling element, establishing thermal contact between the container and said element by means of a frozen liquid having a thermal conductivity substantially greater than that of air, cooling said element until the temperature of said goods is reduced to a required value and removing the container from said element.

According to a preferred feature of the invention, the liquid used to establish thermal contact between the container and the cooling element is water which is frozen in the course of the cooling period.

The containers may be cooled singly or in stacks, and a plurality of containers may be arranged side by side in closely spaced relationship to the cooling element. The containers may be closely surrounded by a housing for confining the liquid, and the housing may be shaped to conform to a particular arrangement of containers. The combined effects of the close proximity between the container or containers and the cooling element and the comparatively high thermal conductivity of the frozen liquid filling the narrow space between them ensure a high rate of heat transfer, with the result that the contents of the containers are rapidly cooled. The use of water according to the preferred feature of the invention is particularly advantageous since, in addition to its high thermal conductivity, it freezes during the cooling period to form ice the thermal conductivity of which is considerably higher even than that of liquid water. Furthermore, thermal contact is maintained owing to the expansion of water on freezing.

While the use of water is preferred, other liquids having a substantially higher thermal conductivity than that of air may be used in accordance with the invention. The chosen liquid should be substantially chemically inert to the container material, in order to minimize corrosion during cooling or storage and possible contamination of the contents of the container. Where a housing surrounding the container or containers is employed, the cooling element of the housing may comprise a jacket surrounding the housing and/or a core extending into the interior of the housing, refrigeration liquid being evaporated in the jacket and core to cool the container in the housing.

Additional cooling means may be provided comprising cooling cores extending into the liquid filling the residual space or into the containers themselves if these are open during the cooling process. Egg yolks or meat pastes filling open containers measuring 25 x 25 x 35 cm. may be cooled to —18° C. in as little as 2 hours according to the method of the invention, by the use of a housing fitted with an evaporation jacket and an evaporation core extending into the contents of each container.

The invention will now be described in more detail with reference to the accompanying drawing which illustrates, by way of example, apparatus for carrying out the method of the invention.

In the drawing:

FIG. 1 is a vertical section of part of a preferred arrangement, showing a container being cooled in a housing;

FIG. 2 is a similar view showing a cooled container being discharged from the housing;

FIG. 3 is a horizontal section of an arrangement including cooling elements extending into the liquid filling the residual space between adjacent containers in the housing;

FIG. 4 is an illustration of a container provided with an axial bore, and FIG. 4a is a vertical section through such a container with a cooling element comprising an evaporation core extending through the bore;

FIG. 5 is a diagram of a tubular housing and a chute having a release mechanism for discharging containers from the housing;

FIG. 6 is a horizontal section of three housings for accommodating cylindrical containers, the housings being provided with a common refrigerant evaporation jacket;

FIG. 7 is a horizontal section of a number of housings of the kind shown in FIG. 6 assembled in an insulating block;

FIG. 8 is a perspective view of two housings for rectangular containers enclosed in a common evaporation jacket;

FIG. 9 is a line diagram of a battery of coolers operating in accordance with the invention; and FIGS. 9a to 9e, respectively, show diagrammatically the multi-way valve of a unit in the battery and its various settings at successive stages of the operational cycle.

Referring to the drawing, wherein like reference numerals designate similar parts in all figures, there is shown a housing 6 of round or polygonal cross section comprising an inner wall 8a and an outer wall 8b spaced therefrom to provide a hollow jacket 8 in which refrigeration liquid may be evaporated to cool the housing. In FIGS. 3 and 5, the outer wall surrounds only one housing, but in the embodiments shown in FIGS. 1, 2, 6, 7 and 8 the outer wall may surround several housings arranged side by side. The inner wall 8a is arranged to conform closely to the walls of the container A to be cooled. A cooling core 7 comprises concentric tubes 7a and 7b and extends close to the base of the housing, outer tube 7b being closed at its lower end to permit the evaporation of refrigeration liquid therein.

A suitable refrigeration unit is connected to supply refrigeration fluid to the inner tube 7a and to apply suction to the outer tube 7b, and to the jacket 8 via pipe 7c. A pipe 8c permits refrigeration fluid to be admitted to and withdrawn from the base of the jacket 8.

The base of each housing comprises a hinged lid 9 of aluminum or other material of good thermal conductivity. In an arrangement comprising a plurality of housings, the housings may be interconnected by means of channels 6a.

Each container A, which may contain, for example, egg yolk, may be made from metal, plastic or cardboard and may have a central bore B (see FIG. 4). It is coated externally with material, such as ski lacquer, to which ice has little adhesion, and is pushed up through the bottom of the housing 6. It is supported therein on a ledge 9a in the upper face of the lid 9 which is locked in position by a latch (not shown). In this position, the container is permitted only a few millimeters side play and the core 7 extends into the contents of the container substantially to the bottom thereof. The base of the housing may alternatively be sealed by initially freezing the lids, previously wetted for the purpose, to the lower part of the housing, or the lid may be temporarily held in position until the wetted container is frozen to the sides of the housing. When the container is secured in the housing, the residual space 6B between it and the inner wall of the housing is filled with water. Cold refrigeration liquid is supplied through line 7a and through line 8c to fill the jacket and the core, and suction is applied to the line 7b. The refrigeration liquid partially evaporates in the core 7 to cool the contents of the container radially outwardly. The suction applied to line 7b removes the resultant refrigerant gas in a stream still containing some refrigeration liquid and this liquid is diverted in droplets through branch line 7c into the jacket 8 in which further evaporation occurs to cool the container and its contents radially inwardly through the water, which is confined in the residual space described and which rapidly freezes. In solidifying, the water expands to pack the residual space completely without forming air voids, thereby ensuring enhanced heat transfer as a result of the greater thermal conductivity of ice.

When the container and its contents have been cooled to the required temperature, the core 7 and jacket 8 are arranged in series, and hot fluid is supplied to the core 7 through the inner tube 7a, passes through pipes 7b and 7c into the jacket 8 forcing the liquid therein to leave through the pipe 8c, until the resultant defrosting process releases the lid 9 (previously unlatched) and the container A drops out of the housing 6 under its own weight, as shown in FIG. 2, the small stump of ice 66 formed in the channel 6a being insufficient to retain the container. The released containers may be received on a table mounted on springs or similar shock absorbers, or a curved chute may be provided to receive the containers discharged from the housing (see FIG. 5).

FIG. 3 illustrates an arrangement in which the interior of a housing 6 is substantially filled by a closely assembled group of four rectangular containers A, cooling being effected by evaporation of refrigerant in the jacket 8 surrounding the housing and also in the cooling cores 7 which extend vertically into the space between the containers A, which space is filled with water during the cooling process.

Closed containers having an axial bore, such as illustrated in FIG. 4, are particularly suitable for use in the cooling method according to the invention since they may be stacked one above the other, the axial bore B of each container A being threaded over a core 7 as shown in FIG. 4a. The bore of each container may then be filled with water and the container contents cooled in the manner described.

The water may be retained in the bores by first freezing the core to the lowermost container, or the containers may be stacked in a closely fitting housing, which may also be provided with a cooling jacket, the housing being substantially filled with water.

In the arrangement shown in FIG. 5, the lowermost of a stack of filled, closed containers in a housing 6 is wetted and temporarily retained in the housing 6 by extension of the spring loaded catch 22a secured at the upper end of the curved chute 22. By evaporation of refrigeration liquid in the annular jacket 8, the container is then frozen to the housing to seal the housing and support the stack of containers therein. The catch 22a may then be retracted by the spring 22b, the residual space 68 in the housing filled with water, and the cooling continued until the temperature of the contents of the containers is lowered to a required value. Hot fluid is then circulated in the jacket 8 and the resultant defrosting automatically releases the containers A from the housing to the chute 22 below. The column of released containers may be separated by the knife-edge tip of the catch 22a and/or the deflection caused by the chute. A coating of ski lubricant on the containers facilitates their separation and the removal of ice from the containers.

In the arrangement shown in FIG. 6, three cylindrical housings for containers are provided with a common jacket 8 of which the outer wall 8b is arranged closely to as much of the perimeter of each housing as possible, in order that the ratio of the cooling surface of the jacket to its volume is maximum. For this reason, the particular grouping of housings shown is preferred for use with cylindrical housings having a common evaporation jacket. An inlet tube 8d for the admission of refrigeration fluid to the jacket 8 extends in the space between the housings, substantially to the bottom of the jacket 8 to reduce the volume of the jacket further.

FIG. 7 shows a group of jacketed housings of the kind illustrated in FIG. 6 supported in a block of suitable thermal insulation 88.

FIG. 8 is an illustration of a twin housing arrangement in which the two rectangular housings 6, are fixed in a common jacket, which is fitted with a pipe drainage 8c at its base and concentric refrigerant delivery and suction pipes 8d and 8e, of which the latter extends into the jacket close to the base thereof. Rectangular, closed containers A previously filled with foodstuff are stacked in each housing, which is sealed in the manner already described, the housings are filled with water, and cold refrigeration liquid admitted to the jacket through pipe 8d is evaporated by applying suction through pipe 8e to cool the contents of the containers, which are subsequently discharged from the housings when the temperature of the contents has fallen to a required temperature.

Referring to FIG. 9, each unit of a cooling battery for cooling filled, open containers comprises an upright housing 6 provided with a cooling core 7 and jacket 8, a tilting bottom lid 9, a jacket base pipe 8c, a water valve 30 for supplying water to the housing, and a multiway valve 10 for controlling the flow of refrigeration fluid to and from the jacket 8 and cooling core 7, which are interconnected by pipe 7c. A discharging mechanism 21 may be associated with each unit, and delivers the cooled containers to a conveyor 22.

A compressor 17, driven by a motor 24, delivers refrigeration fluid to an oil separator 18 and condenser 16 which supplies cold refrigeration liquid to liquid line 1. The compressor delivers hot refrigeration fluid through a branch line to pressure line 4. The suction side of the compressor 17 is connected with suction line 2 through a liquid separator 19 which supplies refrigeration liquid to leveling line 3. The liquid separator is also connected to a float valve 15 which is controlled by a refrigeration liquid receiver 14. The liquid received is supplied with, and can return refrigerant via, a line 5.

FIG. 9a shows the connection effected between the lines 1—5 and each unit by the ports of the multiway valve 10 which is associated with the unit, and the relative positions of the four spaced ducts through the rotatable plug 10a of the valve 10. The body of the valve 10 has been omitted from FIG. 9a. FIGS 9b to 9e show in turn the respective positions of the fixed lines in relation to the ducts of the valve plug 10a corresponding thereto, which are obtained in successive stages of the operational cycle of each unit by rotating the plug of the valve either manually or automatically by remote or time-control in the direction of the arrow in FIG. 9a through 90° at each stage.

A branch from liquid line 1 includes an expansion valve 11a and serves to cool a water tank 13 for supplying water via tank 12 to the housings, through valves 30, the refrigeration fluid used being returned to the liquid separator 19 through the suction line 2.

The operational cycle may be effected independently in each unit and is as follows. A housing is loaded from the bottom with a filled, open container A and the lid 9 held in the closed position by a catch, not shown, to support the container A on the ledge 9a, when the core 7 extends into the container contents close to the bottom of the container. The lid 9 may be wetted and frozen to seal the bottom of the housing in a preliminary cooling operation, after which the catch may be released. The space 68 remaining in the housing is then filled almost to the top of the container A with pre-cooled water from the tank 12 through valve 30.

From the stop position shown in FIG. 9e, in which the unit is effectively isolated, the plug of the multi-way valve 10 is rotated in the direction of the arrow shown in FIG. 9a through 270° to the liquid return position shown in FIG. 9d, in which the outer tube 7b of the cooling core and thus the jacket 8, via line 7c, is connected to the suction line 2. At the same time, the base pipe 8c is connected to the liquid separator 19 through leveling line 3 and to the liquid receiver 14 through line 5 until the jacket 8 is substantially filled to a predetermined level with refrigeration liquid chiefly from the receiver 14, after which the plug of valve 10 is once more rotated in the same direction through 180° to the freezing position shown in FIG. 9b. In this position, the suction to the core 7 and jacket 8 continues, the liquid receiver 14 is isolated from the jacket 8 but the liquid level is maintained therein by leveling line 3 from the liquid separator 19. Cold refrigeration liquid is also admitted from liquid line 1 through preset expansion valve 11 and the inner tube 7a to the core 7. The rapid evaporation of refrigeration liquid in the core and jacket cools the container contents radially outwardly and inwardly, respectively, in the latter case through the water in the space 68 which freezes rapidly.

After a predetermined interval when the temperature of the container contents falls to a required value, the plug of valve 10 is once more rotated in the same direction through 90°, to the defrosting position shown in FIG. 9c. In this position, the supply of cold liquid refrigerant from liquid line 1 to the inner tube 7a of the cooling core 7 is exchanged for hot refrigeration fluid from pressure line 4. At the same time, the outer tube 7b and hence the jacket 8 are disconnected from the suction line 2, the base pipe 8c is disconnected from the leveling line 3 and connected once more to the liquid receiver 14 into which the refrigeration liquid from the jacket 8 is forced by the passage of the hot refrigeration fluid, first through the core and then through the jacket via pipe 7c. During this stage the hot refrigeration fluid releases the core and the jacket respectively from the container contents and the housing to which they were frozen, and permits the lid 9 to be opened under the weight of the released container A which falls on to the discharge equipment 21. A restrictor plate may be fitted in line 7c in accordance with my British Patent No. 802,593, in order to ensure that the core 7 and jacket 8 are released substantially simultaneously and in the minimum time.

Following the release of the container A, the plug of multi-way valve 10 may be rotated once more to the stop position shown in FIG. 9e, and the operational cycle repeated. Alternatively, the defrosting stage may be immediately followed by the liquid return stage of the next cycle.

In the foregoing description, each unit comprises a single housing, but it may instead comprise a plurality of housings within a common jacket. The ducts and ports of valve 10 may be modified to connect the base pipe 8c to the liquid receiver 14 only, during the liquid return stage.

The units of a battery shown in FIG. 9 may be phased so that heat removed from a proportion of units undergoing the freezing cycle by a refrigeration fluid may be utilized in other units undergoing the defrosting cycle.

What I claim is:

1. A method of cooling goods packed in a container, comprising the steps of arranging the container in closely spaced relationship to at least one cooling element, substantially filling the space between the container and the cooling element with water, cooling the element until the water is frozen, maintaining thermal contact between the cooled element and the container, through the frozen water until the temperature of the goods in the container is reduced to a predetermined value, melting the frozen water adhering to the cooling element and removing the container from the element.

2. The method of claim 1, wherein the element is cooled by filling it with a liquid refrigerant and evaporating the liquid refrigerant, and the frozen water is melted off the cooling element by admitting a hot gaseous refrigerant thereto.

3. A method of cooling goods packed in a container, comprising the steps of arranging a group of such containers in closely spaced relationship to at least one cooling element, substantially filling the space between said containers and between the containers and the cooling element with water, cooling the element until all of said water is frozen, maintaining thermal contact between the cooled element and the containers through the frozen water until the temperature of the goods in the containers is reduced to a predetermined value, melting the frozen water adhering to the cooling element and removing the group of containers from the element.

4. The method of claim 3, wherein said containers are stacked one upon the other.

5. A method of cooling goods packed in a container, comprising the steps of arranging the container in a housing having side walls constituting a cooling element, the cooling element closely surrounding the container, positioning an auxiliary cooling element axially of said housing and extending into the container adjacent the goods packed therein, substantially filling the space between the housing side wall and the cooling element with water, cooling the element until the water is frozen, simultaneously cooling the auxiliary cooling element, maintaining thermal contact between the cooled elements and the container until the temperature of the goods in the container is reduced to a predetermined value, melting the frozen water adhering to the cooling element and simultaneously defrosting the auxiliary cooling element, and removing the container from the elements.

6. A method of cooling goods packed in a container, comprising the steps of placing the container on a support member and in closely spaced relationship to a cooling element surrounding the container, freezing the support member to the cooling element to form a housing for said container, placing water in said housing between the container and the cooling element, cooling the element until the water is frozen, maintaining thermal contact between the cooled element and the container until the temperature of the goods in the container is reduced to a predetermined value, melting the frozen water adhering to the cooling element and simultaneously defrosting the support member, and removing the container from the element.

7. A method of cooling goods packed in a container, comprising the steps of placing a stack of superposed containers in closely spaced relationship to a cooling element surrounding the stack of containers, freezing the lowermost of said containers to the surrounding cooling element to form a housing for said containers, placing water in said housing between the containers and the cooling element, cooling the element until the water is frozen, maintaining thermal contact between the cooled element and the containers until the temperature of the goods in the container is reduced to a predetermined value, melting the frozen water adhering to the cooling element and simultaneously defrosting the lowermost container, and removing the containers from the element.

8. A method of cooling goods packed in a container having an axial bore, comprising the steps of arranging a longitudinally extending cooling element in closely spaced relationship to the container in said axial bore, substantially filling the space between said container and the cooling element with water, cooling the element until the water is frozen, maintaining thermal contact between the cooled element and the container through the frozen water until the temperature of the goods in the container is reduced to a predetermined value, melting the frozen water adhering to the cooling element and removing the container from the element.

9. An apparatus for cooling goods packed in a container, comprising a hollow cooling element having inlet and outlet ports, a refrigeration circuit connected to said ports and including a compressor having an input and an output, condenser means connected to said output, a liquid receiver, a first conduit means effective during a liquid return stage for supplying refrigeration liquid from said receiver to said inlet port substantially to fill the element with said liquid, second conduit means effective during a freezing stage for removing evaporating refrigeration gas through said outlet port by suction to the input of the compressor, third conduit means effective during said freezing stage for supplying refrigeration liquid from said condenser means to the cooling element to maintain the level of liquid therein, and a fourth conduit means effective during a defrosting stage for supplying hot refrigeration fluid from the output of the compressor to said element to displace the refrigeration liquid and force it back into the liquid receiver through said first conduit means.

10. The apparatus of claim 9, further comprising a multi-way valve so arranged in said circuit that a complete operational cycle through said stages is effected by successive actuation of the valve.

11. A method of cooling a material contained in a container to a predetermined temperature, comprising placing said container spacedly adjacent a cooling element having a temperature lower than said predetermined temperature; substantially filling the space between said container and said element with a liquid for direct thermal contact between said liquid and said cooling element, and between said liquid and said container, said liquid having a freezing temperature higher than said predetermined temperature; and maintaining said direct thermal contact until said liquid is solidified.

12. A method of cooling a material contained in a container to a predetermined temperature, comprising placing said container spacedly adjacent a cooling element; substantially filling the space between said container and said element with water, said water having a freezing temperature higher than said predetermined temperature; maintaining the temperature of said cooling element at a temperature lower than said predetermined temperature until said water is frozen and said material has been cooled to said predetermined temperature; raising the temperature of said cooling element above the freezing temperature of said water until a layer thereof contiguously adjacent said element is fused; and removing said container together with the frozen remainder of said water from said element.

References Cited in the file of this patent

UNITED STATES PATENTS

| 1,923,899 | Williams | Aug. 22, 1933 |
| 2,015,167 | Varney | Sept. 24, 1935 |
| 2,433,574 | Newton | Dec. 30, 1947 |
| 2,496,143 | Backstrom | Jan. 31, 1950 |
| 2,559,101 | Wool | July 3, 1951 |
| 2,723,534 | Wilbushewich | Nov. 15, 1955 |
| 2,768,507 | Hoen | Oct. 30, 1956 |
| 2,775,099 | Brown | Dec. 25, 1956 |